United States Patent [19]
Ellis

[11] Patent Number: 5,528,844
[45] Date of Patent: Jun. 25, 1996

[54] EXCAVATING APPARATUS WITH A COMPRESSION PLATE AND ASSOCIATED HYDRAULIC CYLINDER FOR THE DEWATERING OF EXCAVATION MATERIAL

[76] Inventor: Mark R. Ellis, 310 Sawmill La., #9B, Horsham, Pa. 19044

[21] Appl. No.: 285,202

[22] Filed: Aug. 3, 1994

[51] Int. Cl.⁶ .............................. B01D 43/00; E02F 3/96
[52] U.S. Cl. .................. 37/403; 37/444; 37/903; 414/912
[58] Field of Search .................. 37/3, 403, 405, 37/406, 443, 444, 445, 901, 903; 209/421; 414/722, 912, 725

[56] References Cited

U.S. PATENT DOCUMENTS

| | | | |
|---|---|---|---|
| 2,402,299 | 6/1946 | Schield | 37/901 X |
| 3,003,265 | 10/1961 | Lutjens | 37/444 |
| 3,072,257 | 1/1963 | Hockenberry | 37/403 X |
| 3,395,798 | 8/1968 | Erickson | 209/421 X |
| 3,461,968 | 8/1969 | Longley | 37/406 X |
| 3,477,573 | 11/1969 | Andersson | 209/421 X |
| 4,157,956 | 6/1979 | Robinson | 209/421 X |
| 4,858,346 | 8/1989 | Schulte | 37/443 X |
| 5,241,764 | 9/1993 | Modig | 37/405 |
| 5,405,092 | 4/1995 | Jonninen | 37/443 X |

FOREIGN PATENT DOCUMENTS

| | | | |
|---|---|---|---|
| 2114933 | 12/1972 | Germany | 37/403 |
| 1808913 | 4/1993 | U.S.S.R. | 37/901 |

Primary Examiner—Blair M. Johnson
Assistant Examiner—Andrea Chop

[57] ABSTRACT

An excavating apparatus with a compression plate and associated hydraulic cylinder for the dewatering of excavation material comprising: an excavator having a stick pivotable at its inboard end with respect to the excavator and a bucket pivotally secured with respect to the outboard end of the stick; a compression plate pivotally secured to the inboard end of the bucket, the compression plate having a planar central section, an angled leading component extending upwardly at an angle between forty and fifty degrees from the compression plate at the leading edge of the compression plate and an inverted J-shaped coupling component with a long linear segment and a short linear segment adjacent to the inboard end of the compression plate; a pivot pin coupling the free end of the short linear segment coupling component with the inboard end of the bucket and with the long linear component secured to the inboard end of the compression plate; and a plurality of apertures formed in the central section of the compression plate and the angled leading component.

5 Claims, 4 Drawing Sheets

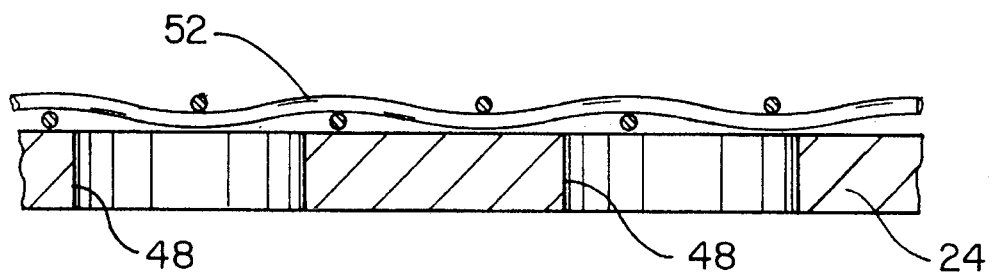
FIG. 7
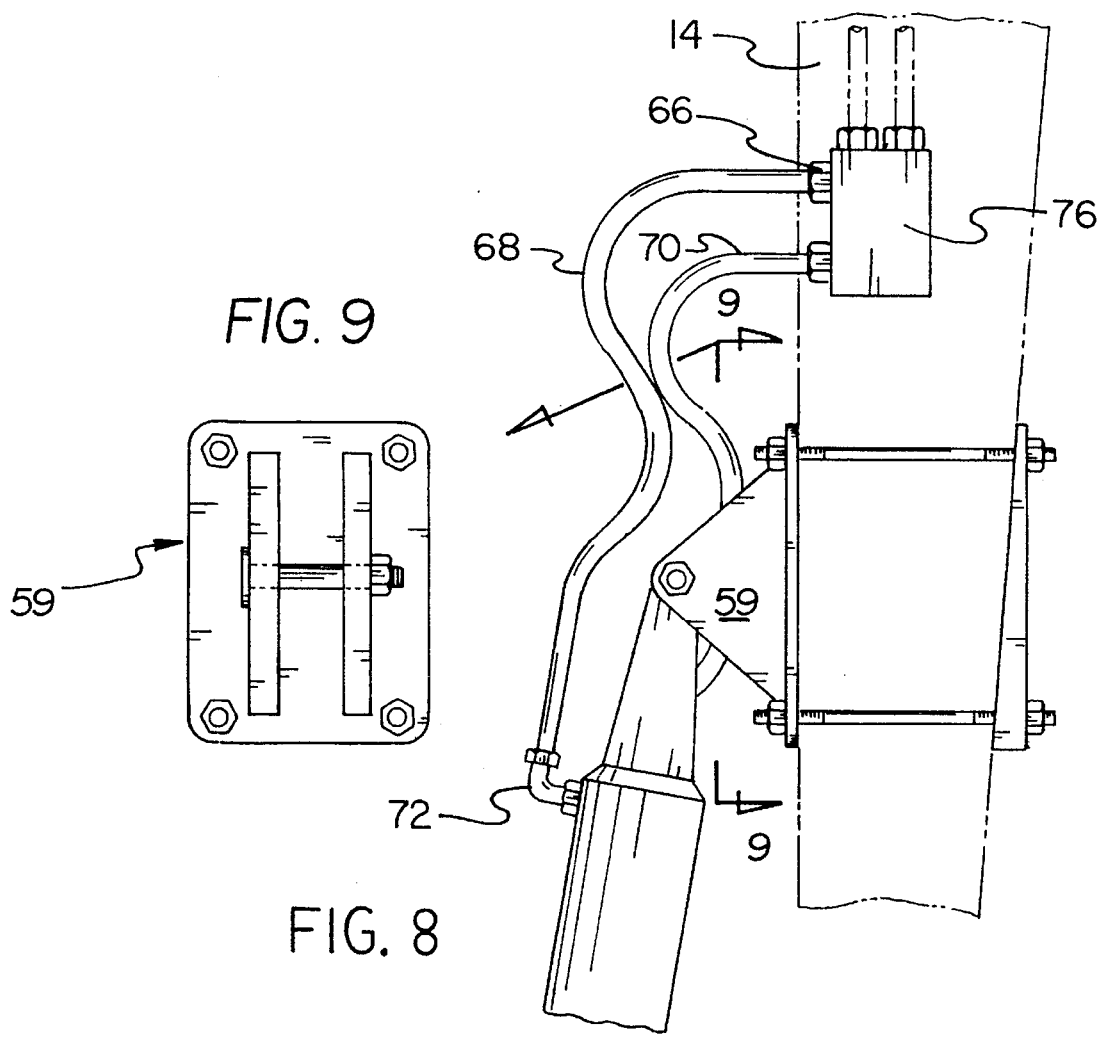
FIG. 9
FIG. 8

EXCAVATING APPARATUS WITH A COMPRESSION PLATE AND ASSOCIATED HYDRAULIC CYLINDER FOR THE DEWATERING OF EXCAVATION MATERIAL

BACKGROUND OF THE INVENTION

1. Field of the Invention

The present invention relates to an excavating apparatus with a compression plate and associated hydraulic cylinder for the dewatering of excavation material and more particularly pertains to compressing excavation material to drain therefrom water prior to the dumping of the material from the bucket of an excavating machine.

2. Description of the Prior Art

The use of excavation equipment of a wide variety of designs and configurations for digging and removing soil is known in the prior art. More specifically, excavation equipment of a wide variety of designs and configurations for digging and removing soil from an area of excavation are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,792,786 a single-bucket excavator.

U.S. Pat. No. 3,881,612 discloses a backhoe bucket apparatus.

U.S. Pat. No. 4,081,919 discloses a backhoe bucket.

U.S. Pat. No. 4,537,556 discloses a reciprocating backhoe bucket.

U.S. Pat. No. 4,698,926 discloses a hydraulic excavator and compactor bucket therefore.

In this respect, the excavating apparatus with a compression plate and associated hydraulic cylinder for the dewatering of excavation material according to the present invention substantially departs from the conventional concepts and designs of the prior art, and in doing so provides an apparatus primarily developed for the purpose of compressing excavation material to drain therefrom water prior to the dumping of the material from the bucket of the machine.

Therefore, it can be appreciated that there exists a continuing need for a new and improved excavating apparatus with a compression plate and associated hydraulic cylinder for the dewatering of excavation material which can be used for compressing excavation material to drain therefrom water prior to the dumping of the material from the bucket of the machine. In this regard, the present invention substantially fulfills this need.

SUMMARY OF THE INVENTION

In view of the foregoing disadvantages inherent in the known types of excavation equipment of a wide variety of designs and configurations for digging and removing soil now present in the prior art, the present invention provides an improved excavating apparatus with a compression plate and associated hydraulic cylinder for the dewatering of excavation material. As such, the general purpose of the present invention, which will be described subsequently in greater detail, is to provide a new and improved excavating apparatus with a compression plate and associated hydraulic cylinder for the dewatering of excavation material and method which has all the advantages of the prior art and none of the disadvantages.

To attain this, the present invention essentially comprises a new and improved excavating apparatus with a compression plate and associated hydraulic cylinder for the dewatering of excavation material comprising, in combination: an excavator having a stick pivotable at its inboard end with respect to the excavator and a bucket pivotally secured with respect to the outboard end of the stick; a compression plate pivotally secured to the inboard end of the bucket, the compression plate having a planar central section, an angled leading component extending upwardly at an angle between forty and fifty degrees from the compression plate at the leading edge of the compression plate and an inverted J-shaped coupling component with a long linear segment and a short linear segment adjacent to the inboard end of the compression plate; a pivot pin coupling the free end of the short linear segment coupling component with the inboard end of the bucket and with the long linear component secured to the inboard end of the compression plate; a plurality of apertures formed in the central section of the compression plate and the angled leading component; a screen positioned above the compression plate to preclude particulate material from moving therepast but sufficient to allow the movement of water therethrough; a hydraulic cylinder having an upper end pivotally secured to the stick of the excavator adjacent to its outboard end, the hydraulic cylinder having an outboard end pivotally secured to vertical plates extending upwardly from the upper surface of the compression plate; and control means including pneumatic lines coupled at their outboard ends to the cylinder and at their inboard end to a source of pneumatic pressure with associated control means to effect the pressurization of the ends of the cylinder to effect the pivoting of the compression plate within the bucket with respect to soil contained therein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved excavating apparatus with a compression plate and associated hydraulic cylinder for the dewatering of excavation material which has all the advantages of the prior art excavation equipment of a wide variety of designs and configurations for digging and removing soil and none of the disadvantages.

It is another object of the present invention to provide a new and improved excavating apparatus with a compression plate and associated hydraulic cylinder for the dewatering of excavation material which may be easily and efficiently manufactured and marketed.

It is a further object of the present invention to provide a new and improved excavating apparatus with a compression plate and associated hydraulic cylinder for the dewatering of excavation material which is of durable and reliable construction.

An even further object of the present invention is to provide a new and improved excavating apparatus with a compression plate and associated hydraulic cylinder for the dewatering of excavation material which is susceptible of a low cost of manufacture with regard to both materials and labor, and which accordingly is then susceptible of low prices of sale to the consuming public, thereby making such excavating apparatus with a compression plate and associated hydraulic cylinder for the dewatering of excavation material economically available to the buying public.

Still yet another object of the present invention is to provide a new and improved excavating apparatus with a compression plate and associated hydraulic cylinder for the dewatering of excavation material which provides in the apparatuses and methods of the prior art some of the advantages thereof, while simultaneously overcoming some of the disadvantages normally associated therewith.

Still another object of the present invention is to compress excavation material to drain therefrom water prior to the dumping of the material from the bucket of the machine.

Lastly, it is an object of the present invention to provide new and improved excavating apparatus with a compression plate and associated hydraulic cylinder for the dewatering of excavation material comprising: an excavator having a stick pivotable at its inboard end with respect to the excavator and a bucket pivotally secured with respect to the outboard end of the stick; a compression plate pivotally secured to the inboard end of the bucket, the compression plate having a planar central section, an angled leading component extending upwardly at an angle between forty and fifty degrees from the compression plate at the leading edge of the compression plate and an inverted J-shaped coupling component with a long linear segment and a short linear segment adjacent to the inboard end of the compression plate; a pivot pin coupling the free end of the short linear segment coupling component with the inboard end of the bucket and with the long linear component secured to the inboard end of the compression plate; and a plurality of apertures formed in the central section of the compression plate and the angled leading component.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross-sectional view taken along line 7—7 of FIG. 4.

FIG. 8 is an enlarged side elevational view between the coupling at the upper end of the hydraulic cylinder and the stick of the excavator.

FIG. 9 is a top view of the coupling mechanisms secured to the stick of the excavator taken along line 9—9 of FIG. 8.

The same reference numerals refer to the same parts through the various Figures.

DESCRIPTION OF THE PREFERRED EMBODIMENT

Figure 1:
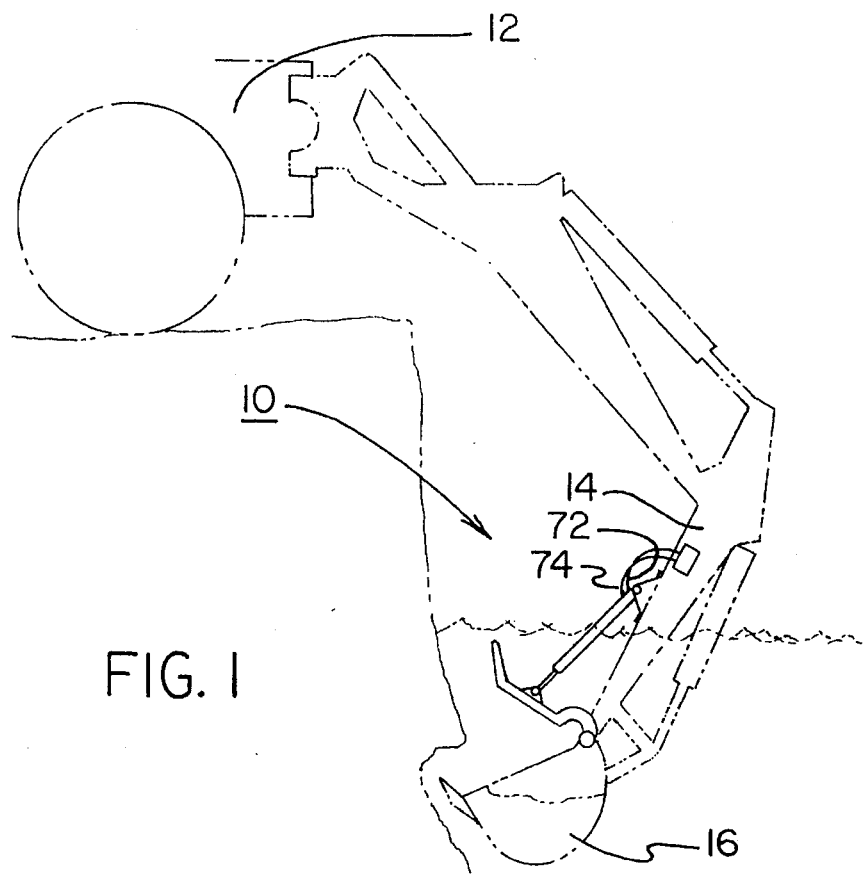
FIG. 1 is a side elevational view of the preferred embodiment of the new and improved excavating apparatus with a compression plate and associated hydraulic cylinder for the dewatering of excavation material constructed in accordance with the principles of the present invention.

With reference now to the drawings, and in particular to FIG. 1 thereof, the preferred embodiment of the new and improved excavating apparatus with a compression plate and associated hydraulic cylinder for the dewatering of excavation material embodying the principles and concepts of the present invention and generally designated by the reference numeral 10 will be described.

The present invention, the new and improved excavating apparatus with a compression plate and associated hydraulic cylinder for the dewatering of excavation material, is a system comprised of a plurality of components. Such components, in their broadest context, include an excavator with a stick, a compression plate, a pivot pin, apertures, a screen, a hydraulic cylinder and controls. Such components are individually configured and correlated with respect to each other so as to attain the desired objective.

More specifically, the central component to which the present system 10 is to be utilized is an excavator 12. The excavator is of a type having a stick 14. The stick is a linear rigid member having an inboard end which is pivotable through a hinge and pivot point with respect to the excavator. The excavator is also of a type having a bucket 16 secured with respect to the outboard end of the stick. Coupling is through a hinge 18. The hinge allows the pivoting action about a pivot pin 20 which constitutes the axis of rotation for the hinge and bucket with respect to the stick.

The next component of the system 10 is a compression plate 24. The compression plate is pivotally secured at its inboard end with respect to the inboard end of the bucket. The compression plate is a rigid component in a rectangular configuration. It has a planar central section 26. The compression plate also has an angled leading component 28 extending outwardly and upwardly at an angle of between about forty and fifty degrees with respect to the compression plate at the leading end 30 of the compression plate. Coupling therebetween is pivotal and is effected through the use of a J-shaped coupling component 32. Such coupling component has a long linear segment 34 and a short linear segment 36. It is located between the inboard end of the compression plate and bucket.

In association with the compression plate and bucket, there is provided a pivot pin 20. Such pivot pin is coupled through associated apertures 42 between the free ends of the short linear segment for coupling the coupling component with the inboard end of the bucket. The pivot pin, as stated previously, supports the bucket and the hinge and constitutes the axis of rotation for both. In association therewith, the long linear component is secured to the inboard end of the compression plate. A curved component 44 of the compression plate is between the long and short linear segments.

Next provided to effect the dewatering function are a plurality of apertures 48 formed in the central extent of the compression plate. Similarly, apertures are located through the angled leading component at the forward end of the compression plate.

The efficiency of the present system 10 is increased through the use of a screen 52. Such screen is positioned above and in contact with the upper surface 54 of the compression plate. Such positioning of the screen will allow covering of the apertures in the compression plate. This will preclude particulate material from moving therepast and therethrough. The size of the mesh of the screen, however, is sufficient to allow the movement of water therethrough in the intended manner.

Figure 2:
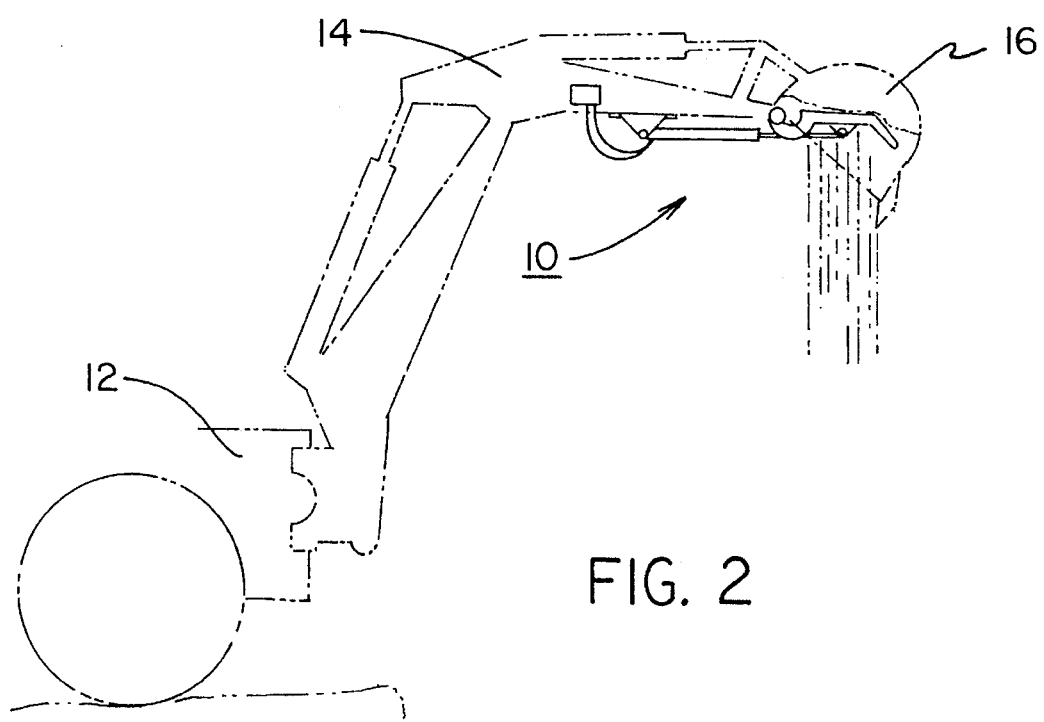
FIG. 2 is a side elevational view of the apparatus shown in FIG. 1 shown in an alternate configuration.
Figure 3:
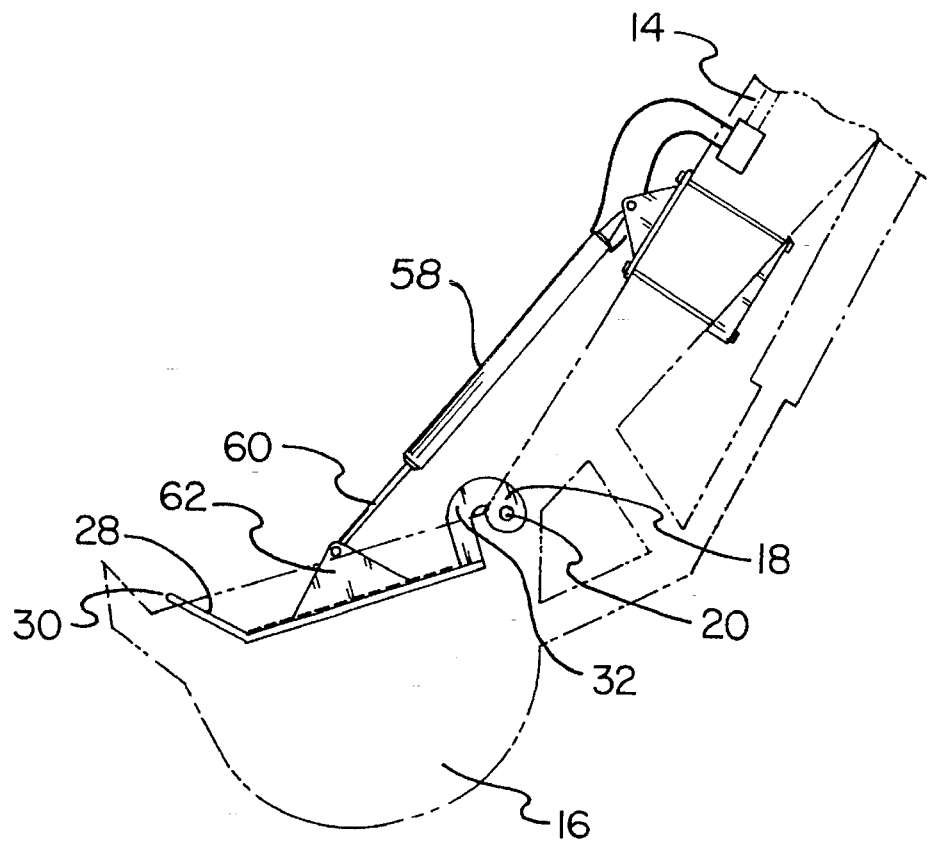
FIG. 3 is an enlarged side elevational view of the bucket, compression plate, hydraulic cylinder and stick of the excavating machine of FIGS. 1 and 2.
Figure 4:
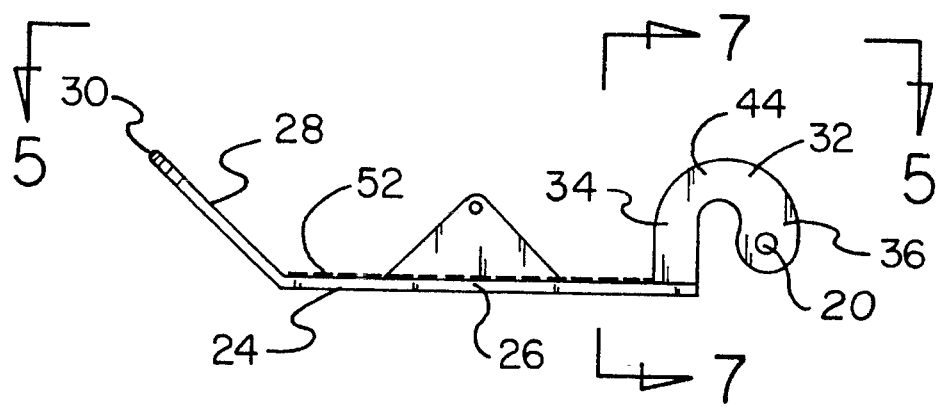
FIG. 4 is an enlarged side elevational view of the compression plate of the prior Figure.
Figure 5:
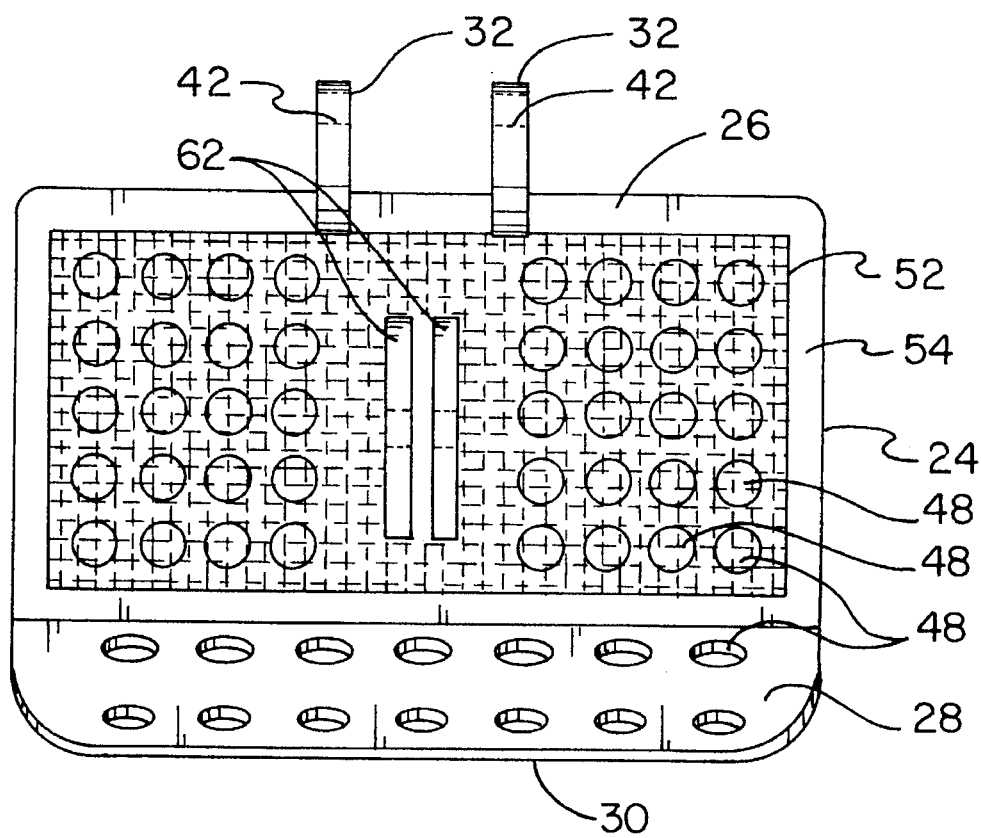
FIG. 5 is a top elevational view taken along line 5—5 of FIG. 4.
Figure 6:
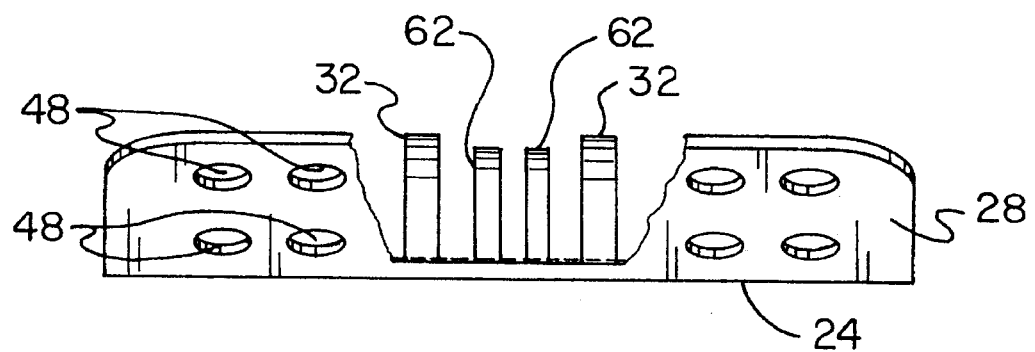
FIG. 6 is a front elevational view of the compression plate shown in FIG. 5.

Next provided as part of the system 10 is a hydraulic cylinder 58. The hydraulic cylinder has an upper end pivotally secured to the stick of the excavator with a coupling mechanism 59 spaced from the stick's outboard end. The hydraulic cylinder also has an outboard end 60 pivotally secured to the vertical plates 62. Such plates extend upwardly from the upper surface of the compression plate. The hydraulic cylinder rotates the compression plate above the bucket when the bucket is scooping liquefied soil, as shown in FIG. 1. The hydraulic cylinder lowers the compression plate over the bucket for coupling after the bucket has completed scooping. As the bucket is raised its open portion faces downward with the compression plate positioned within the bucket through the open portion. As shown in FIG. 2, liquids contained in the scooped soil are allowed to pass through the apertures leaving soil and remnants in the bucket.

The last component of the system 10 is the control means 66. Such control means include pneumatic lines 68 and 70. Such lines are coupled at their outboard ends 72 and 74 to the cylinder. At their inboard ends, the lines are coupled to a source of pneumatic pressure. Associated control means 76 are provided to effect the pressurization of the cylinders in the conventional manner. This functions to effect the pivoting of the compression plate within the bucket with respect to the soil contained therein to effect the draining of water therefrom.

The present invention is designed to be attached to the stick of an excavator for the purpose of compressing liquids from contaminated soils during the excavation process. It is simply comprised of a hydraulic cylinder and a compression plate. The hydraulic cylinder is bolted or permanently connected to the stick just below the accessory hydraulic outlet. The compression plate is pivotally mounted near the end of the excavator stick at one of its ends, and the extension from the piston in the hydraulic cylinder is connected at the top central area of the plate.

The bottom member of the compression plate, or that which makes contact with the soil, is a heavy slotted plate. Above this heavier plate, the compression plate also houses a sieve size screen which is selected to allow the migration of variously sized particulates and the liquid. The screen may be changed from time to time to vary the size of the sieve as needed for excavation. Hence, it can be seen that, as each load is collected in the bucket or scoop of the excavator, it is a simple matter to actuate the compression plate through its excursion and thereby expunge contaminants.

The present invention is simple and can be quickly put in place. As such, it should be a cost effective alternative to soil washing, sludge pressing, centrifuging, etc. Further, the hydraulic power source required is already in place on most excavators since it is required for accessories such as shears, grapplers, hoe rams, etc. and no added cost is involved for this feature.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An excavating apparatus with a compression plate and associated hydraulic cylinder for the dewatering of excavation material comprising, in combination:

an excavator having a stick pivotable at its inboard end with respect to the excavator and a bucket pivotally secured with respect to an outboard end of the stick;

a compression plate pivotally secured to an inboard end of the bucket, the compression plate having a planar central section, an angled leading component extending upwardly at a constant angle between forty and fifty degrees from a leading of the planar central section and an inverted J-shaped coupling component with a long linear segment and a short linear segment adjacent to an inboard end of the compression plate;

a pivot pin coupling a free end of the short linear segment of the coupling component with the inboard end of the bucket and with the long linear segment secured to the inboard end of the compression plate said pivot pin defining an axis parallel to said planar central section;

a plurality of apertures formed in the central section of the compression plate and the angled leading component;

a screen positioned above the compression plate to preclude particulate material from moving therepast but sufficient to allow the movement of water therethrough;

a hydraulic cylinder having an upper end pivotally secured to the stick of the excavator with coupling mechanism spaced from the outboard end of the stick, the hydraulic cylinder having an outboard end pivotally secured to vertical plates extending upwardly from an upper surface of the compression plate; and control means including pneumatic lines coupled at their outboard ends to the cylinder and at their inboard ends to a source of pneumatic pressure with associated control means to effect the pressurization of the cylinder to effect the pivoting of the compression plate within the bucket with respect to soil contained therein, the control means causes the cylinder to rotate the compression plate above the bucket when the bucket is scooping liquefied soil, the control means causing the cylinder to rotate the compression plate down into the bucket when the bucket has collected liquefied soil, the control means is capable of holding the compression plate in the bucket when the bucket is lifted upward by the stick, and the bucket is facing downward, for releasing the liquid from the soil through the apertures.

2. An excavating apparatus with a compression plate and associated hydraulic cylinder for the dewatering of excavation material comprising:

an excavator having a stick pivotable at its inboard end with respect to the excavator and a bucket pivotally secured with respect to an outboard end of the stick;

a compression plate pivotally secured to an inboard end of the bucket, the compression plate having a planar central section, an angled leading component extending upwardly at a constant angle between forty and fifty degrees from a leading edge of the planar central section and an inverted J-shaped coupling component with a long linear segment and a short linear segment adjacent to an inboard end of the compression plate;

a pivot pin coupling a free end of the short linear segment of the coupling component with the inboard end of the bucket and with the long linear segment secured to the inboard end of the compression plate; said pivot pin defining an axis parallel to said planar central section; and a plurality of apertures formed in the central section of the compression plate and the angled leading component.

3. The apparatus as set forth in claim 2 further including a screen in contact with an upper surface of the compression plate to preclude particulate material from moving therepast but sufficient to allow the movement of water therethrough.

4. The apparatus as set forth in claim 2 and further including a hydraulic cylinder having an upper end pivotally secured to the stick of the excavator adjacent to its outboard end, the hydraulic cylinder having an outboard end pivotally secured to vertical plates extending upwardly from an upper surface of the compression plate.

5. The apparatus as set forth in claim 4 and further including a control means including pneumatic lines coupled at their outboard ends to the cylinder and at their inboard ends to a source of pneumatic pressure with associated control means to effect the pressurization of the cylinder to effect the pivoting of the compression plate within the bucket with respect to soil contained therein after the bucket has scooped liquefied soil, the control means is capable of holding the compression plate in the bucket when the bucket is lifted upward by the stick, and the bucket is facing downward, for releasing the liquid from the soil through the apertures.

\* \* \* \* \*